United States Patent
Caram et al.

(10) Patent No.: US 12,147,692 B2
(45) Date of Patent: Nov. 19, 2024

(54) MANAGING DATA STORAGE CONSOLIDATION

(71) Applicant: Dell Products L.P., Round Rock, TX (US)

(72) Inventors: Bruce E. Caram, Hudson, MA (US); Vamsi K. Vankamamidi, Hopkinton, MA (US); Alexei Karaban, Southborough, MA (US); Ajay Karri, South Grafton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/299,354

(22) Filed: Apr. 12, 2023

(65) Prior Publication Data
US 2024/0345751 A1    Oct. 17, 2024

(51) Int. Cl.
*G06F 3/06* (2006.01)
*G06F 12/02* (2006.01)

(52) U.S. Cl.
CPC .......... *G06F 3/064* (2013.01); *G06F 3/0608* (2013.01); *G06F 3/0665* (2013.01); *G06F 3/067* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 8,909,887 B1 | 12/2014 | Armangau et al. | |
| 11,226,774 B2 | 1/2022 | Vankamamidi et al. | |
| 11,436,140 B2 * | 9/2022 | Na | G06F 12/0238 |
| 11,556,270 B2 | 1/2023 | Lee et al. | |
| 2011/0022778 A1 * | 1/2011 | Schibilla | G06F 12/0246 711/170 |
| 2016/0103617 A1 * | 4/2016 | Kang | G06F 12/0246 711/103 |
| 2017/0052719 A1 * | 2/2017 | Boitei | G06F 3/0688 |
| 2019/0179698 A1 * | 6/2019 | Liu | G06F 3/0679 |
| 2019/0179741 A1 * | 6/2019 | Liu | G06F 3/064 |
| 2020/0110697 A1 * | 4/2020 | Wu | G06F 12/0253 |
| 2021/0216447 A1 * | 7/2021 | Fu | G06F 12/0822 |
| 2023/0087470 A1 * | 3/2023 | Kato | G06F 3/064 711/154 |

OTHER PUBLICATIONS

U.S. Appl. No. 18/160,732, filed Jan. 27, 2023, entitled "Storage Management System and Method".

* cited by examiner

*Primary Examiner* — Kaushikkumar M Patel
(74) *Attorney, Agent, or Firm* — BainwoodHuang

(57) ABSTRACT

A technique consolidates data at multiple levels of granularity, the levels including a first level based on whole PLBs (physical large blocks) and a second level based on portions of donor PLBs. The technique further includes tracking PLBs in multiple PLB queues arranged based on storage utilization of the PLBs, and tracking PLB portions in multiple portion queues arranged based on storage utilization of the portions. When consolidating data to create a new PLB, a set of whole PLBs is selected, based on utilization, from the PLB queues, and a set of portions of donor PLBs is selected, based on utilization, from the portion queues. The selections are performed such that the total data size of the selected whole PLB(s) and the selected portion(s) fit within the new PLB.

19 Claims, 7 Drawing Sheets

PLB Utilization Queues 142

0%-10% BPs = 1   90%-100% BPs = 8 — 302, 304

0%-10% BPs = 1   90%-100% BPs = 8

VLB Utilization Queues 144

0%-5%   95%-100%

List 330 of PLBs in Sub-Uber

MANAGING DATA STORAGE CONSOLIDATION

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some storage systems perform data consolidation, such as garbage collection or defragmentation. Such a system may store data in physical large blocks (PLBs) of uniform size. The system may be configured to write data in PLB increments and to perform no overwrites. Anytime data of an old PLB is written to, a new PLB is allocated and the new data is written to the new PLB. Corresponding locations of the old PLB are invalidated. Over time, PLBs tend to become more sparsely populated with data, giving rise to a continual need for data consolidation.

Prior approaches to data consolidation have involved identifying two or more old PLBs whose valid data can fit into a new PLB and then moving the valid data from the old PLBs to the new PLB. The old PLBs are then freed, resulting in a net gain of free PLBs. The storage system can thus remain in a healthy state in which it has enough free PLBs to accommodate new writes.

SUMMARY

Unfortunately, consolidating data by combining old PLBs into new PLBs is not always efficient. Multiple old PLBs can only be combined, for example, if the combined size of their valid data does not exceed the storage capacity of a new PLB. If a storage system is highly utilized, there may be few PLBs that have 50% or lower utilization. This would mean that many old PLBs could not be combined, as most combinations would fail to fit within a new PLB. A worst-case scenario is one in which all PLBs in a system are just over 50% utilized, as no PLB consolidation could occur even though nearly half of the storage space is unused. What is needed is a more flexible way of combining data of old PLBs into new PLBs.

The above need is addressed at least in part by an improved technique that consolidates data at multiple levels of granularity, the levels including a first level based on whole PLBs (physical large blocks) and a second level based on portions of donor PLBs. The technique further includes tracking PLBs in multiple PLB queues arranged based on storage utilization of the PLBs, and tracking PLB portions in multiple portion queues arranged based on storage utilization of the portions. When consolidating data to create a new PLB, a set of whole PLBs is selected, based on utilization, from the PLB queues, and a set of portions of donor PLBs is selected, based on utilization, from the portion queues. The selections are performed such that the total data size of the selected whole PLB(s) and the selected portion(s) fit within the new PLB.

Advantageously, the improved technique can form new PLBs using portions of existing PLBs, rather than having to rely solely upon using whole PLBs in their entirety. Data consolidation can thus proceed even in highly utilized systems, creating new free PLBs and thus keeping the systems healthy.

Certain embodiments are directed to a method of consolidating data storage space. The method includes selecting a set of source PLBs (physical large blocks) from a plurality of PLB queues that track PLBs based on utilization, selecting a set of source-PLB portions from a plurality of PLB-portion queues that track PLB portions based on utilization, and copying data from the selected set of source PLBs and data from the selected set of source-PLB portions to a target PLB.

Other embodiments are directed to a computerized apparatus constructed and arranged to perform a method of consolidating data storage space, such as the method described above. Still other embodiments are directed to a computer program product. The computer program product stores instructions which, when executed on control circuitry of a computerized apparatus, cause the computerized apparatus to perform a method of consolidating data storage space, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of consolidating data operates at multiple levels of granularity, the levels including a first level based on whole PLBs (physical large blocks) and a second level based on portions of donor PLBs. The technique further includes tracking PLBs in multiple PLB queues arranged based on storage utilization of the PLBs, and tracking PLB portions in multiple portion queues arranged based on storage utilization of the portions. When consolidating data to create a new PLB, a set of whole PLBs is selected, based on utilization, from the PLB queues, and a set of portions of donor PLBs is selected, based on utilization, from the portion queues. The selections are performed such that the total data size of the selected whole PLB(s) and the selected portion(s) fit within the new PLB.

Figure 1:
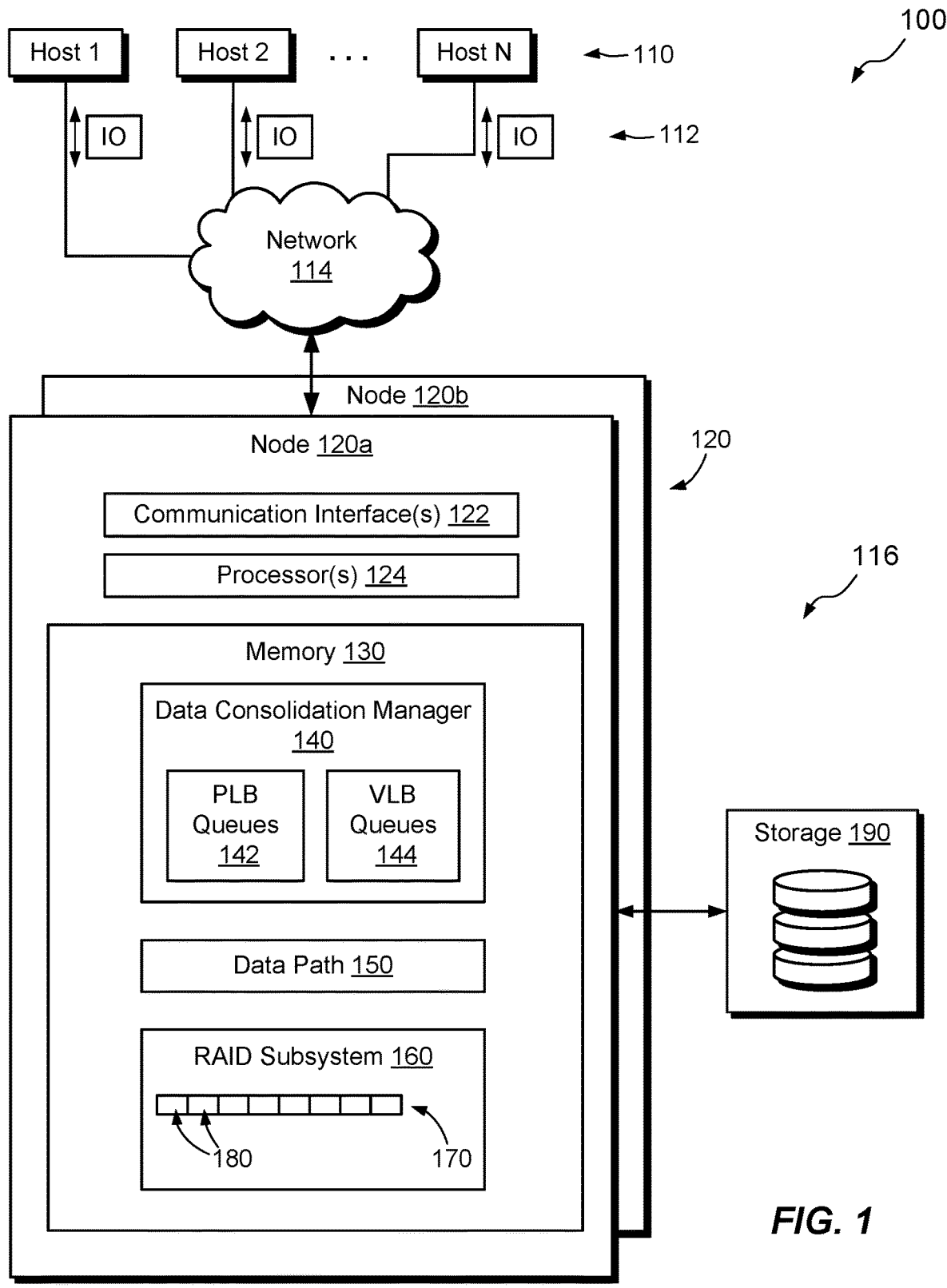
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where separate hosts 110 are provided, such hosts 110 may connect to a node 120 using various technologies, such as Fibre Channel, iSCSI (Internet small computer system interface), NVMeOF (Nonvolatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data consolidation manager 140, a data path 150, and a RAID (redundant array of independent disks) subsystem 160. The data consolidation manager 140 is configured to manage activities related to data consolidation, such as garbage collection and defragmentation. To this end, the data consolidation manager 140 may employ various queues, such as PLB (physical large block) queues 142 and VLB (virtual large block) queues 144, which may track PLBs and VLBs, respectively, based on utilization. As described more fully below, a VLB corresponds to a portion of a PLB. Thus, VLB queues 144 may also be referred to as "PLB-portion queues." The data path 150 is configured to organize user data, e.g., by mapping logical addresses (e.g., addresses used by hosts 110 in identifying user data) to corresponding physical data blocks stored in PLBs of the storage system 116. The RAID subsystem 160 organizes storage drives (e.g., disk drives) provided in storage 190 into RAID arrays 170, such as RAID groups or mapped RAID arrays. In an example, each RAID array 170 includes a number (e.g., eight in the depicted example) of disk segments 180, where each disk segment 180 in any given array 170 is provided from a different, respective disk drive in storage 190. Although only a single RAID array 170 is shown, typical systems include tens, hundreds, or thousands of such arrays. As used herein, the term "uber" may refer to a disk array 170 and the term "sub-uber" may refer to a segment 180. Typically, each segment 180 (sub-uber) includes a large number of PLBs, such as hundreds or thousands of PLBs. PLBs themselves may be provided as uniformly sized chunks, which are typically in the megabyte range (e.g., 1 MB, 2 MB, 16 MB, etc.). Each PLB stores a large number of data blocks, which may be compressed.

In example operation, the hosts 110 issue I/O requests 112 to the data storage system 116. A node 120 receives the I/O requests 112 at the communication interfaces 122 and initiates further processing. Such processing may involve reading and writing data of disk arrays 170, which are backed by storage 190.

In an example, the data storage system 116 is configured always to write new user data to new PLBs and to invalidate corresponding data that is being replaced in old PLBs. As a result, old PLBs tend to become less utilized over time, as more and more original data is replaced with newer data. A need thus arises to consolidate space, e.g., by combining decreasing amounts of still-valid data in two or more old PLBs into a new PLB, which can be more completely filled. The old PLBs can then be freed and put back into circulation as new PLBs, ready to receive new user data.

The data consolidation manager 140 manages the consolidation of data from old PLBs into new PLBs. To enable efficient operation, the data consolidation manager 140 employs PLB queues 142 and VLB queues 144. The PLB queues 142 are arranged based on utilization, e.g., with each PLB queue covering a respective range of PLB utilization (e.g., 0%-10%, 10%-20%, 20%-30%, and so on, but which may be of any suitable size). A PLB's utilization reflects the amount of still-valid data stored in the PLB as a percentage of the PLB's total size. Thus, a PLB having a utilization of 20% contains 20% valid data and 80% unused space, which may include invalidated data.

As with PLB queues 142, VLB queues 144 may also be arranged based on utilization, with each VLB queue covering a respective range of utilization (e.g., 0%-5%, 5%-10%, 10%-15%, and so on, but which may be of any suitable size). VLB utilization may be expressed as a percentage of a PLB that the VLB references. For example, a VLB that references 30% of a PLB's data capacity is said to have a utilization of 30%. Defining utilization in this manner allows PLB utilization and VLB utilization to be directly compared, but doing so is not required. PLB utilization ranges and VLB utilization ranges may also be referred to herein as utilization "buckets."

With the above-described arrangement, the data consolidation manager 140 may operate by selecting a set of source PLBs from the PLB queues 142, such that a sum of the upper-range limits of the queues 142 does not exceed 100%, but preferably equals 100% or as close thereto as practicable. For example, the data consolidation manager 140 might select a first PLB from a 50%-60% PLB queue 142 and a second PLB from a 30%-40% PLB queue 142. As the upper-range limits of the queues 142 are 60% and 40%, respectively, the sum of the upper-range limits equals 100%.

Given the coarse manner in which PLB queues 142 track PLB utilization, the actual utilization of the selected set of source PLBs is typically less than 100%, and it may be as small as 80% (i.e., the sum of the lower-range limits, 50% and 30%). In accordance with improvements hereof, a more accurate measure of PLB utilization in the selected set of source PLBs is determined, and the data consolidation manager 140 selects a set of source VLBs (PLB portions) from the VLB queues 144 to at least partially fill but not to exceed the residual space, i.e., the space that would be left over if only the set of source PLBs were copied to a new PLB. The new PLB may also be referred to herein as a "target PLB." In some examples, the set of source VLBs consists of only a single VLB, but the set of source VLBs may include any number of VLBs. Data of the selected set of source PLBs and the selected set of source VLBs are then copied to the target PLB. Each of the set of source PLBs is then freed. Also, each of the set of source VLBs is removed from the PLB from which it originated (also referred to herein as a "donor PLB"), causing each donor PLB to become less utilized. Advantageously, using the set of source VLBs in addition to the set of source PLBs more completely fills the target PLB than could be achieved by combining source PLBs alone, thus improving the efficiency of data consolidation. Doing so also reduces the sizes of donor PLBs, making them better candidates for combining with other PLBs later.

Figure 2:
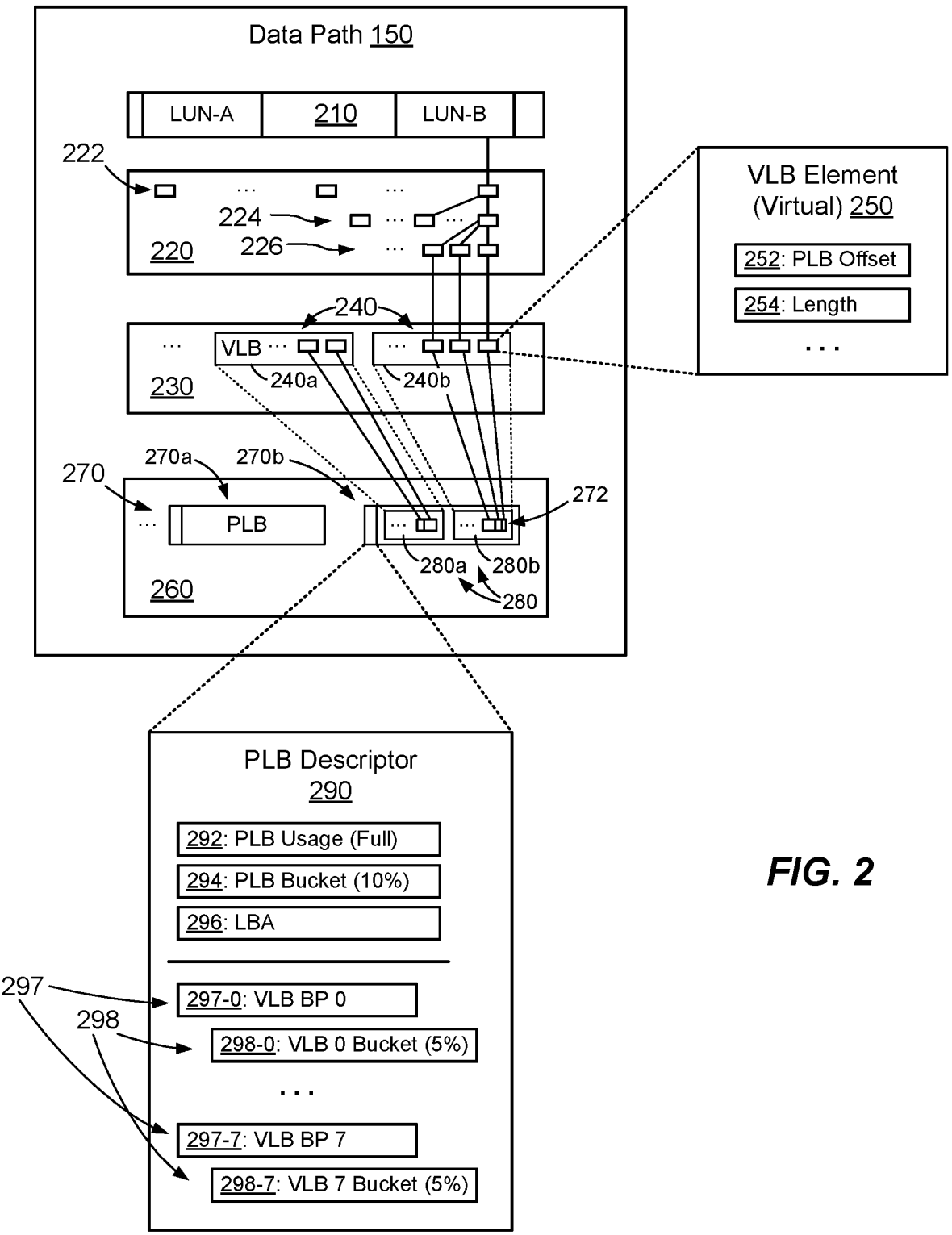
FIG. 2 is a block diagram of an example data path of FIG. 1.

FIG. 2 shows an example data path 150 in greater detail. Here, data path 150 includes a logical "namespace" layer 210, a mapping layer 220, a virtualization layer 230, and a physical layer 260. The namespace layer 210 is a large, logical address space configured to organize data objects, such as host-accessible LUNs (Logical UNits), file systems, virtual machine disks, and the like, with LUN-A and LUN-B being shown as examples. Logical addresses in the namespace layer 210 identify respective logical data blocks, where each logical data block represents a uniform amount of storage space, such as 4 kB (kilobytes), 8 kB, 64 kB, or the like. The data storage system 116 typically has a predefined logical block size, which sets the logical size of all data blocks. Block sizes in the namespace layer 210 are "logical" because they represent uncompressed data blocks. Corresponding compressed data blocks may be tracked by the physical layer 260.

Mapping layer 220 contains multiple levels of mapping pointers that establish paths from logical blocks in the namespace layer 210 to corresponding virtual blocks 250 ("virtuals" or "VLB elements") in the virtualization layer 230. In an example, the mapping layer 220 is implemented using a B-tree that includes three levels of pointers, tops 222, mids 224, and leaves 226. Although not shown, tops 222, mids 224, and leaves 226 may be arranged in arrays, which are stored in blocks. For example, each top array points to a large number of mid arrays, each mid array points to a large number of leaf arrays, and each leaf array points to a large number of virtuals 250. If logical data blocks are 4 kB and the "large number" referenced above is 512, then each leaf 226 points to 2 MB, each mid 224 points to 1 GB (gigabyte), and each top 222 points to 512 GB. In this manner, the mapping layer 230 can map a very large number of logical blocks in the namespace layer 210 to corresponding virtuals 250 in the virtualization layer 230.

The virtualization layer 230 arranges virtuals 250 into arrays called VLBs (virtual large blocks) 240, where each VLB 240 contains a large number of virtuals 250, such as 512. Assuming a 4-kB logical block size, each VLB 240 can map up to 2 MB of uncompressed data blocks. Two VLBs 240*a* and 240*b* are specifically shown, but the storage system 116 may include hundreds or thousands of VLBs, if not more. VLBs serve critical functions in the storage system 116, such as supporting data block mobility and deduplication.

In an example, VLBs have the property that each VLB may reference data in one and only one PLB. Thus, a single VLB may not be split between different PLBs. Each virtual 250 points to a single respective physical block 272 in the physical layer 260. As shown to the right in FIG. 2, each virtual 250 stores an offset 252 and a length 254. The offset 252 defines the starting point of a corresponding compressed data block in a PLB, and the length 254 defines the length of the compressed block. Virtuals may include additional information (not shown), such as a checksum, a compression technique, and other metadata.

The physical layer 260 includes multiple PLBs 270. Two PLBs 270*a* and 270*b* are specifically show, but there may be hundreds, thousands, or more PLBs present. As shown, the virtuals 250 in VLB 240*a* point to physical blocks 272 in a first PLB portion 280*a* of PLB 270*b*. Also, the virtuals 250 in VLB 240*b* point to physical blocks 272 in a second PLB portion 280*b* of PLB 270*b*. The PLB portions 280 thus correspond to respective VLBs 240. In general, a PLB 270 may store the data referenced by one or more VLBs 240, typically up to eight VLBs 240, with the upper limit being set arbitrarily based on design factors which are not limiting.

As shown at the bottom of FIG. 2, each PLB 270 has an associated PLB descriptor 290. The PLB descriptor 290 may be stored with the compressed data (e.g., as a header or footer), or it may be stored separately, such as in a storage region dedicated to PLB descriptors. Each PLB descriptor 290 stores information about the associated PLB 270, such as the PLB's actual data usage 292, i.e., the actual amount of compressed data stored in the PLB. The descriptor 290 also stores an identifier 294 of a PLB utilization bucket to which the PLB may be assigned in the PLB queues 142 (FIG. 1). For example, if PLB buckets are provided in 10% intervals, then the bucket identifier 294 may be provided simply as an integer that ranges from 0 to 9 (e.g., 0 for 0%-10%, and 9 for 90%-100%). The PLB descriptor 290 may further store an LBA (logical block address) of the respective PLB 270, e.g., a corresponding range of logical blocks in the namespace layer 210. The PLB descriptor 290 may further store information about the VLBs 240 that reference the respective PLB 270. Such information may include, for example, a backpointer for each VLB that references data in the PLB, as well as an associated utilization bucket for each VLB. For example, backpointers 297-0 . . . 297-7 and utilization buckets 298-0 . . . 298-7 may be provided for up to eight referencing VLBs. In an example, the VLB utilization ranges are provided in 5% intervals and may be represented as integers ranging from 0 to 19. Preferably, VLB ranges (e.g., 5% intervals) are smaller than PLB ranges (e.g., 10% intervals) to enable more accurate filling of target PLBs than would be possible VLB ranges and PLB ranges were the same size. The sizes of the ranges may be chosen in order to balance many design factors and are not considered critical.

Figure 3:
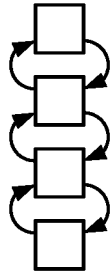
FIG. 3 is a block diagram of example data structures that may be used for managing data consolidation in some embodiments.
Figure 3:
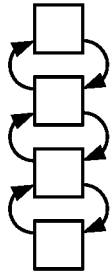
Figure 3:
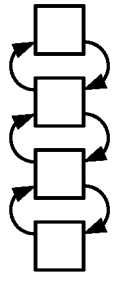
Figure 3:
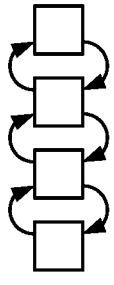
Figure 3:
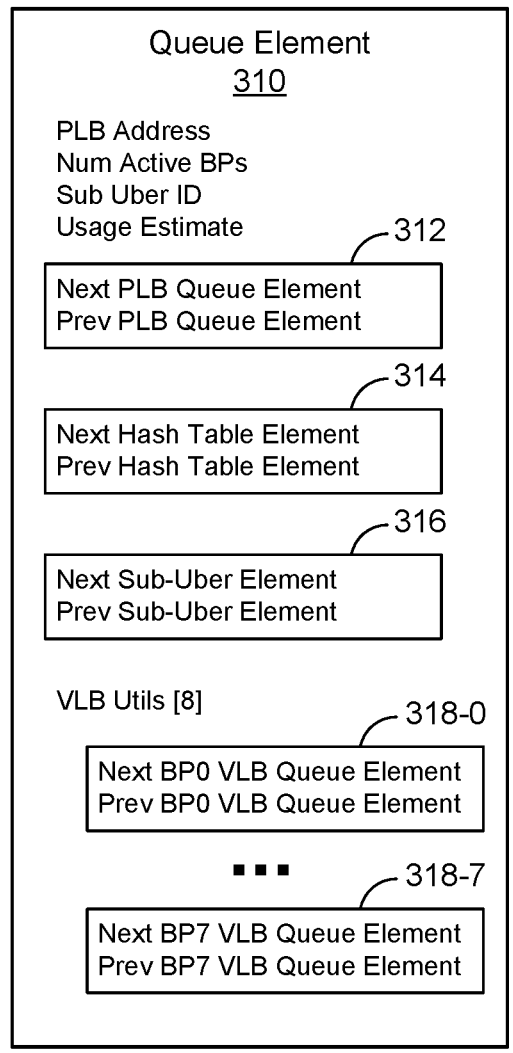
Figure 3:
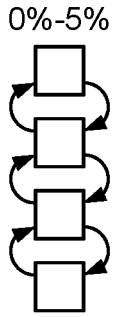
Figure 3:
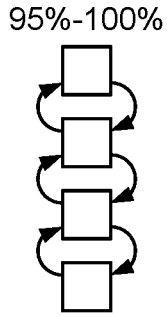
Figure 3:
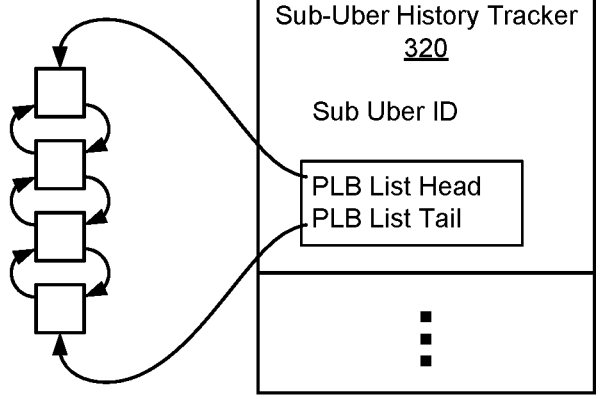

FIG. 3 shows an example of queues and other data structures that may be useful in consolidating data by the data consolidation manager 140. Here, ten PLB utilization queues 142 are shown vertically, at 10% utilization intervals. Each range or interval has a lower-utilization limit 302 and an upper-utilization limit 304. As an optimization, PLBs may also be arranged (horizontally) based on the number of backpointers (VLBs) that they reference. The depicted arrangement thus includes a total of eighty queues (10-by-8). Each PLB queue 142 may include any number of PLBs (although certain implementations may limit the maximum number). FIG. 3 further shows VLB (PLB-portion) queues 144, which may be provided at 5% utilization intervals, for example. Each VLB queue 144 may include any number of VLBs.

In an example, queue elements 310 represent PLBs and VLBs within the queues 142 and 144. The same queue element 310 may be represented in multiple queues, such as in a single PLB queue 142 and in up to eight VLB queues 144 (one for each referencing VLB). To this end, each queue element 310 includes a location 312 of its own position within the PLB queues 142 and up to eight locations 318-0 to 318-7 of its own position within the VLB queues 144. Each such location may be specified by identifying a previous queue element and a next queue element. One should appreciate that the queues 142 and 144 are logical structures formed by multiple queue elements 310, and that the same queue elements 310 may appear in multiple queues.

In some examples, the data consolidation manager 140 employs other queues besides PLB queues 142 and VLB (PLB-portion) queues 144. These may include, for example, sub-uber queues (lists) for tracking PLBs within storage extents. For example, list 330 provides a queue of all PLBs contained in a particular storage extent (sub-uber). A sub-uber history tracker 320 arranges entries for multiple storage extents and identifies a head and a tail of a list 330 provided for each respective extent. As with the queues 142 and 144, the lists 330 are also populated with queue elements 310. In an example, the queue element 310 may include its own location 316 within a list 330, e.g., by identifying previous and next elements.

In some examples, the data consolidation manager 140 may further employ a hash table (not shown) for ensuring the uniqueness of PLBs being tracked, i.e., for ensuring that no PLB is represented by more than one queue element 310. For example, a unique feature of a PLB, such as its address, is hashed and compared with hash values of other PLBs in the hash table. A new queue element may be created only if the hash table does not already contain an entry for the computed hash value. When a hash table is used, the queue element 310 may further include a location 314 of the respective PLB within the hash table.

The depicted arrangement allows for efficient management of queue elements 310. For example, anytime a source PLB is used in creating a new target PLB, the locations of the queue element 310 for the source PLB within the queues 142, 144, and 330, and within the hash table (if present), can be accessed from the queue element 310 itself. Each queue can be mended easily by connecting the indicated previous element to the corresponding next element. The queue element 310 can then be removed from the respective queues. When consuming a VLB in creating a new target PLB, the location of the queue element 310 for the consumed VLB can be removed from the VLB queues 144 using a similar procedure, i.e., by connecting the previous VLB queue element to the next. If the VLB being consumed is the last VLB still remaining in the PLB, then the entire PLB can be removed from all of the queues as described above. The depicted arrangement avoids extensive searching through queues and provides direct and nearly immediate access to queue elements 310 for removal within the respective queues. Once a queue element 310 has been removed from all of the queues, the queue element 310 may itself be deleted.

The above benefits are particularly salient when the data consolidation manager 140 manages PLBs on a per-storage-extent basis. For example, the data consolidation manager 140 may receive storage extents (e.g., sub-ubers 180) to be "cleaned" from the RAID subsystem 160. The data consolidation manager 140 tracks such sub-ubers in the sub-uber history tracker 320, which points to the corresponding lists 330 of PLBs in the respective sub-ubers. As time passes, the sub-uber history tracker 320 may become full, or some other limit may be reached, which results in the data consolidation manager 140 purging an entire sub-uber from the sub-uber history tracker 320.

Figure 4:
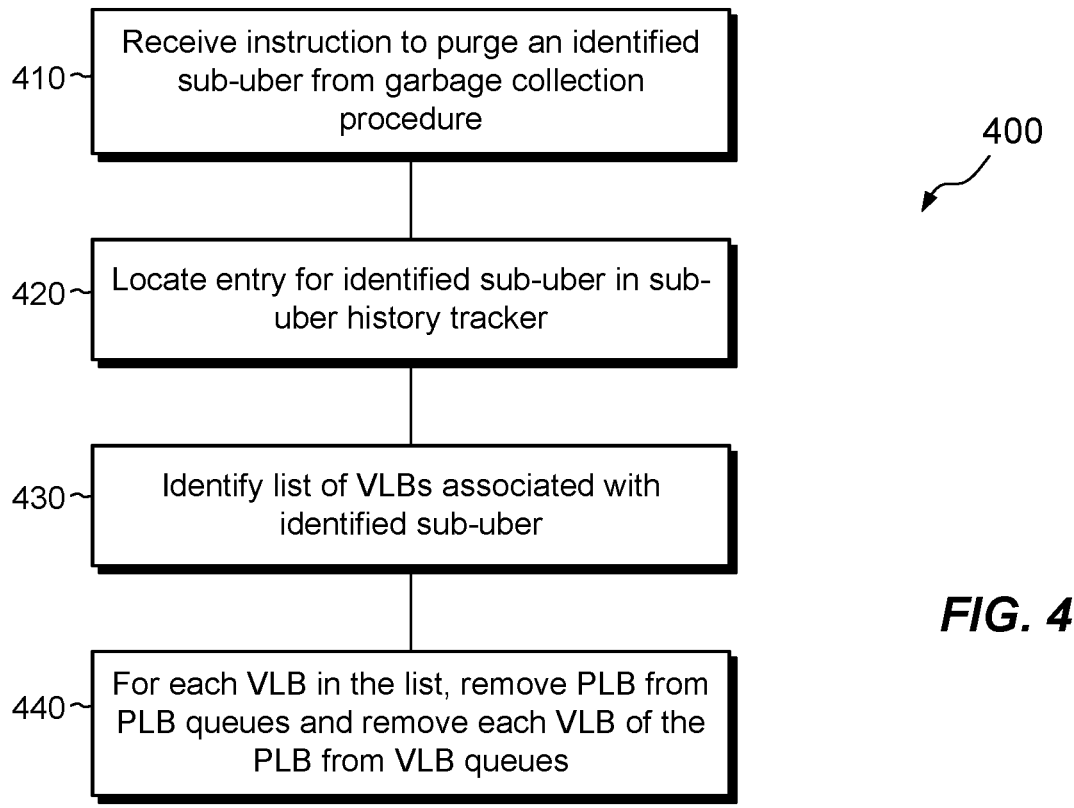
FIG. 4 is a flowchart showing an example method of purging data-consolidation tracking information from the data structures of FIG. 3 for a particular storage extent.

FIG. 4 shows an example method 400 for performing such purging. At 410, the data consolidation manager 140 receives an instruction to purge an identified sub-uber, such that the identified sub-uber will no longer be used in garbage collection or other PLB consolidation. At 420, the data consolidation manager 140 locates an entry for the identified sub-uber in the sub-uber history tracker 320, and, at 430, identifies the corresponding list 330 of VLBs associated with the identified sub-uber. At 440, the data consolidation manager 140 iterates over all the VLBs in the list 330, removing the associated queue elements 310 from the PLB queues 142 and the VLB queues 144, as well as from the hash table (if provided). The queues are easily mended (by connecting previous queue elements 310 to next queue elements. Once a queue element 310 is removed from all of its referenced queues, the queue element 310 may itself be deleted. One should appreciate that the efficiencies described above for removing single queue elements are multiplied hundreds or thousands of times when removing queue elements on a per-sub-uber basis.

In an example, the data consolidation manager 140 populates queues 142 and 144 and their queue elements 310 on a sub-uber basis by scanning PLB descriptors 290 (FIG. 2) of PLBs contained within a sub-uber. For example, PLB queues 142 may be populated by reading the PLB bucket information 294 and numbers of backpointers 297 stored in the descriptors 290, and by placing queue elements 310 created for those PLBs in the queues 142 based on utilization and numbers of backpointers. In a similar manner, VLB queues may be populated by reading the VLB bucket information 298. In addition to other information, queue elements 310 may store usage estimates of associated PLBs, based on PLB usage 292 obtained from the descriptors 290.

In some circumstances, it is not always efficient to use all PLB queues 142 when consolidating data. Nor is it always efficient to populate all PLB queues 142. For example, a PLB with high utilization is likely to become less utilized over time, such that it may not be efficient to use a highly utilized PLB when performing consolidation, as it will become a better candidate as more time passes. Also, we have observed that the usefulness of a particular PLB for data consolidation depends upon the average utilization of PLBs in the system as a whole. Thus, for example, a system with low average PLB utilization might not be able to efficiently use PLBs having high utilization when performing data consolidation.

Figure 5:
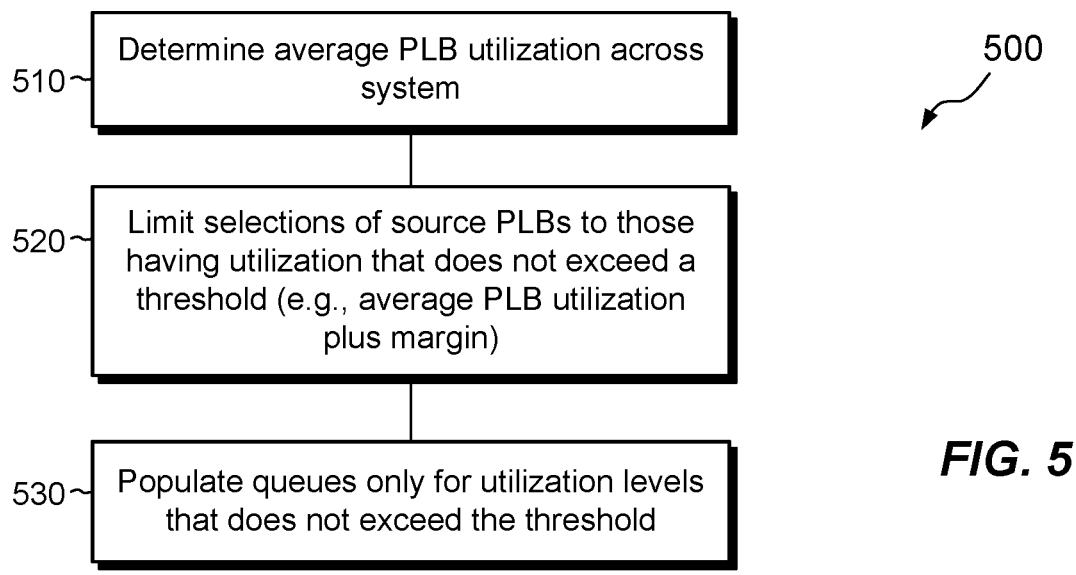
FIG. 5 is a flowchart showing an example method of limiting PLB candidates based on average PLB utilization when performing data consolidation.

FIG. 5 shows an example method 500 of managing data consolidation based on average PLB utilization. At 510, an average PLB utilization across a data storage system 116 is determined. In some examples, the average PLB utilization may be scoped to something smaller than the entire system, such as to a particular storage tier or other storage unit. At 520, the data consolidation manager 140 limits selections of source PLBs to those having PLB utilization that does not exceed a threshold. The threshold may be determined, for example, as the average PLB utilization plus a margin. In an example, the margin is selected as 10%, but the margin may be as high as 20%. Thus, for example, if the average PLB utilization is 50%, the data consolidation manager 140 may limit its choices in selecting source PLBs to 60% (or at most 70%). Likewise, if the average PLB utilization is 70%, the data consolidation manager 140 may limit its choices in selecting source PLBs to 80% (or at most 90%).

Not only does the data consolidation manager 140 limit the choices it uses for source PLBs based on average PLB utilization, but also it may limit the choices it makes in populating the queues 142. For example, there may be nothing gained by populating queues with PLBs whose utilization is much greater than the average PLB utilization in the system. Accordingly, at 530, the queues are populated only for PLBs having utilization levels that do not exceed the threshold (average PLB utilization plus margin). In this manner, memory resources are conserved by populating queues only with PLBs that are likely to result in efficient combinations.

Figure 6:
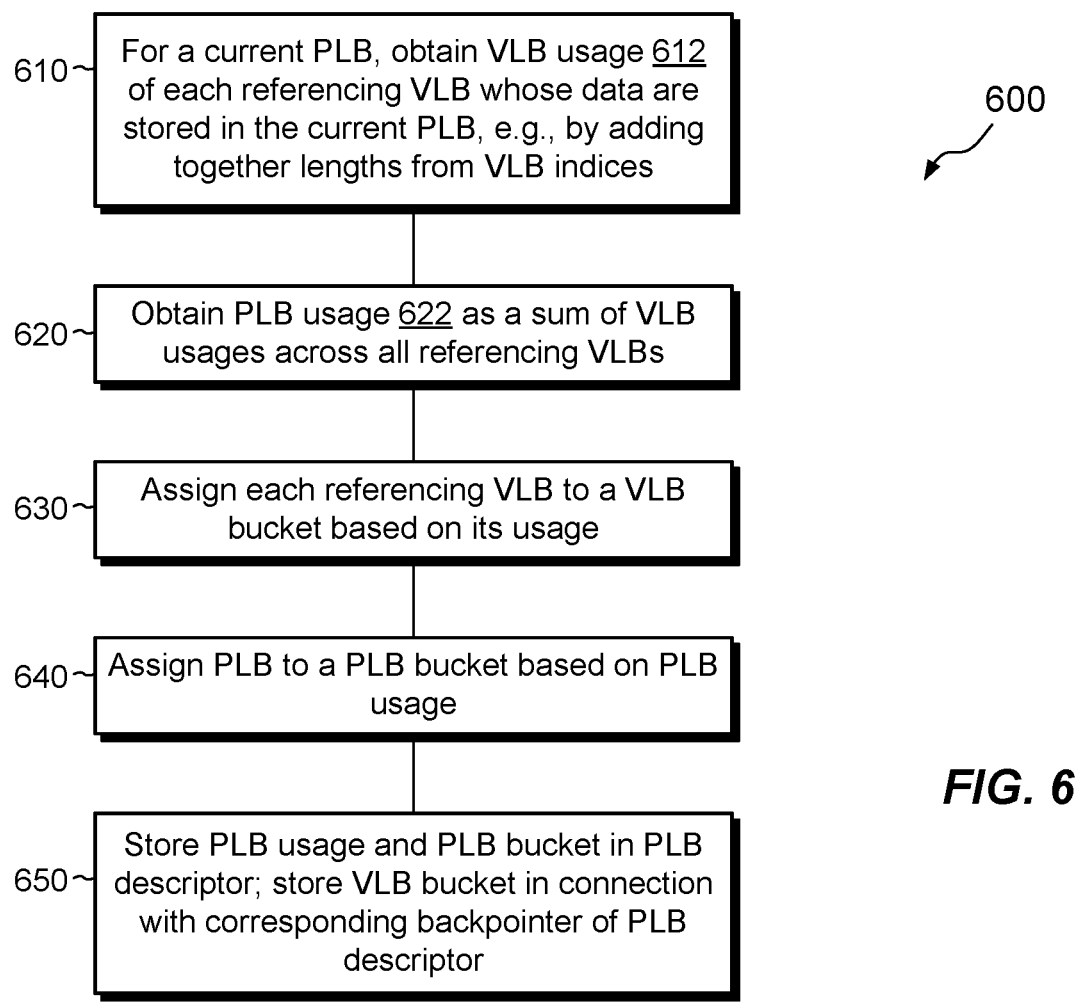
FIG. 6 is a flowchart showing an example method of determining accurate measures of PLB and VLB usage in the environment of FIGS. 1-3.

FIG. 6 shows an example method 600 of determining data usage and utilization buckets for PLBs and VLBs. The method 600 may be performed, for example, by the data path 150, as shown in FIG. 2. At 610, the data path 150 obtains VLB usage 612 of each VLB (PLB portion) that references a current PLB. To obtain data usage 612 for a particular VLB, the data path 150 may iterate over all virtuals 250 in that VLB and add together all of the lengths 254 of the compressed blocks. The resulting sum represents, with high accuracy, the total amount of storage space consumed in the PLB for that VLB. The same summing procedure may be repeated for each VLB referencing the current PLB (i.e., for each backpointer), and the resulting sums 612 for all VLBs may be added together (at 320) to produce, with high accuracy, a total data usage 622 of the current PLB as a whole. The total data usage 622 may be accurate to within a small number of bytes.

At 630, each referencing VLB for the current PLB may be assigned to a VLB bucket 298 (e.g., a 5% bucket). At 640, the PLB as a whole can be assigned to a PLB bucket 294 (e.g., a 10% bucket) based on the PLB usage 622.

At 650, the data path 150 may store the PLB usage 622 and the PLB bucket 294 of the PLB descriptor 290. It may also store the VLB bucket 298 in the PLB descriptor 290 for each referencing VLB, e.g., in connection with the respective backpointer.

The acts of method 600 may be varied, and the particular order shown is merely an example. Typically, the data path 150 performs the depicted acts as part of its normal operations, such as the first time it writes the current PLB. It may also update the buckets and data usage each time it updates the referencing VLBs, e.g., for tracking data invalidation, deduplication, and the like. With the depicted arrangement, the data consolidation manager 140 can readily access PLB descriptors 290 and populate the queues and other data structures shown in FIG. 3.

Figure 7:
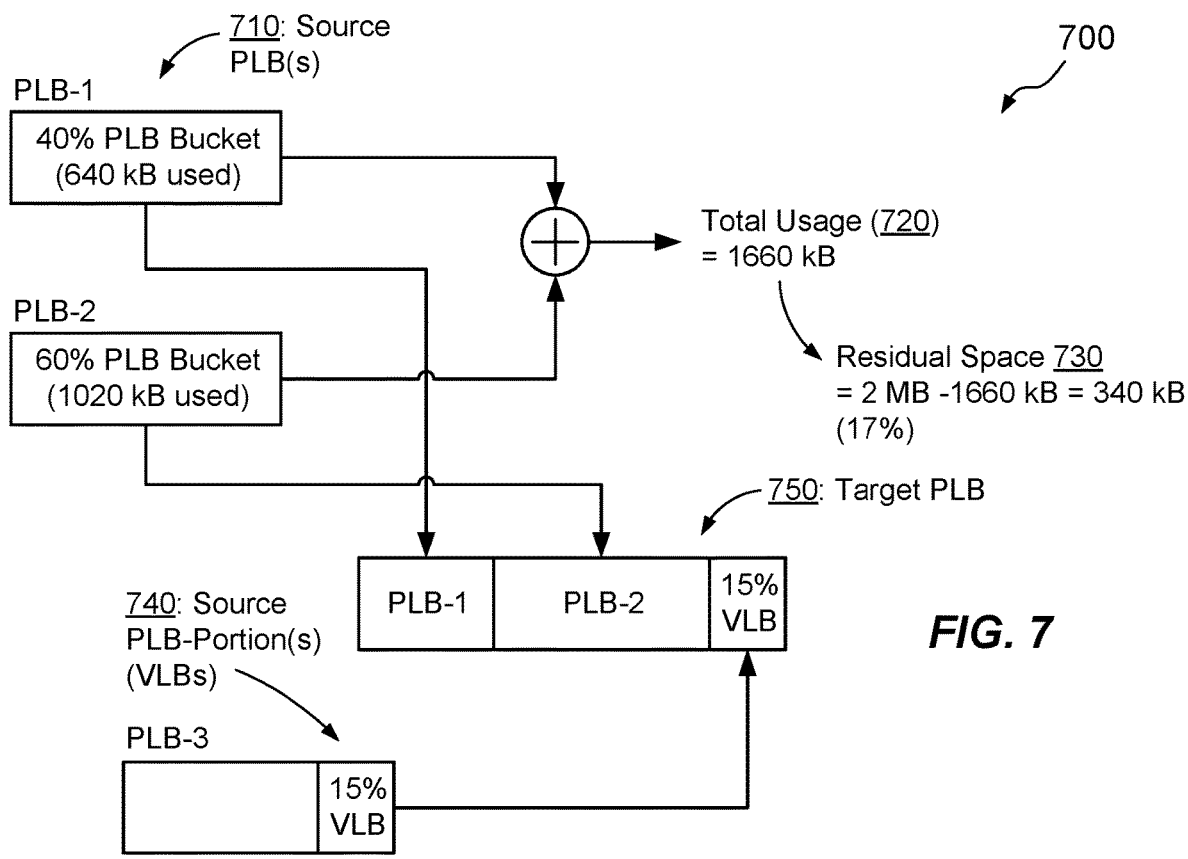
FIG. 7 is a block diagram showing an example arrangement for combining a set of source PLBs and a set of source VLBs when performing data consolidation.
Figure 8:
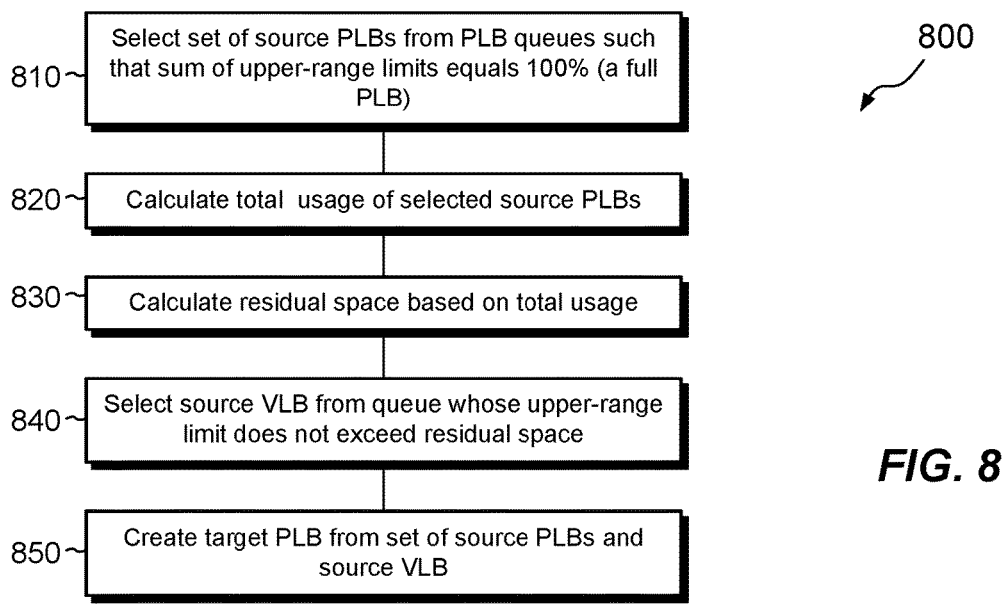
FIG. 8 is a flowchart showing an example method of combining a set of source PLBs and a set of source VLBs when performing data consolidation.

FIGS. 7 and 8 respectively show an example arrangement 700 and method 800 of consolidating data in accordance with the embodiments described above. Method 800 may be performed, for example, by the data consolidation manager 140. Although a particular mathematical approach is shown, one should appreciate that the same results can be achieved through different but equivalent approaches. Thus, the depicted approach is intended as illustrative rather than limiting. The depicted approach assumes a 2-MB PLB size, which is intended merely as an example.

Beginning at 810 of FIG. 8 with reference to FIG. 7, the data consolidation manager 140 selects a set of source PLBs 710 from the PLB queues 142. The individual source PLBs 710 are selected such that the sum of their upper-range limits 304 preferably equals 100%, although this is not required. The set of source PLBs typically includes multiple PLBs, but it may alternatively include a single PLB. In the example shown, the selected source PLBs 710 includes a first PLB (PLB-1) and a second PLB (PLB-2). PLB-1 is chosen from a 30%-40% queue (upper-range limit 40%) and has an actual PLB usage 622 of 640 kB (32%), while PLB 2 is chosen from a 50%-60% queue and has an actual PLB usage 622 of 1020 kB (51%).

At 820, the data consolidation manager 140 calculates a total usage 720 of the selected set of source PLBs 710. In this case, the total usage is the sum of the PLB usages 622 of the individual source PLBs, i.e., 640 kB plus 1020 kB, or a total of 1660 kB.

At 830, the data consolidation manager 140 calculates a residual space 730 based on the total usage 720 as a difference between the total storage capacity of the target PLB and the total usage 720, i.e., 2 MB minus 1660 kB equals 340 kB. The residual space (340 kB) represents approximately 17% of the size of a PLB.

At 840, the data consolidation manager 140 selects a source VLB 740 from a VLB queue 144 such that the upper-range limit 304 of the selected VLB queue does not exceed the residual space 730. As the residual space in this example is 17% of the size of the target PLB, the closest VLB queue whose upper-range limit does not exceed this value is the 10%-15% VLB queue. A VLB may thus be selected from this 10%-15% VLB queue. Any VLB may be selected from this queue, but by convention a first or last VLB may be selected. The source VLB 740 that is selected belongs to a donor PLB, shown as PLB-3 in FIG. 7.

At 850, a target PLB 750 is created from the data of the selected set of source PLBs 710 (PLB-1 and PLB-2) and from the data of the selected source VLB 740. The source PLBs 710 may then be freed, and the source VLB 740 may be removed from the donor PLB-3. Removing the source VLB 740 causes the donor PLB-3 to become less utilized. As a result, PLB-3 may be reassigned to a new PLB queue 142 that reflects more accurately its new level of utilization. If removing the source VLB from PLB-3 causes PLB-3 to become completely empty, the data consolidation manager 140 may remove PLB-3 from the PLB queues 142 (as well as from the other queues) and may delete the queue element 310 that represents PLB-3.

Figure 9:
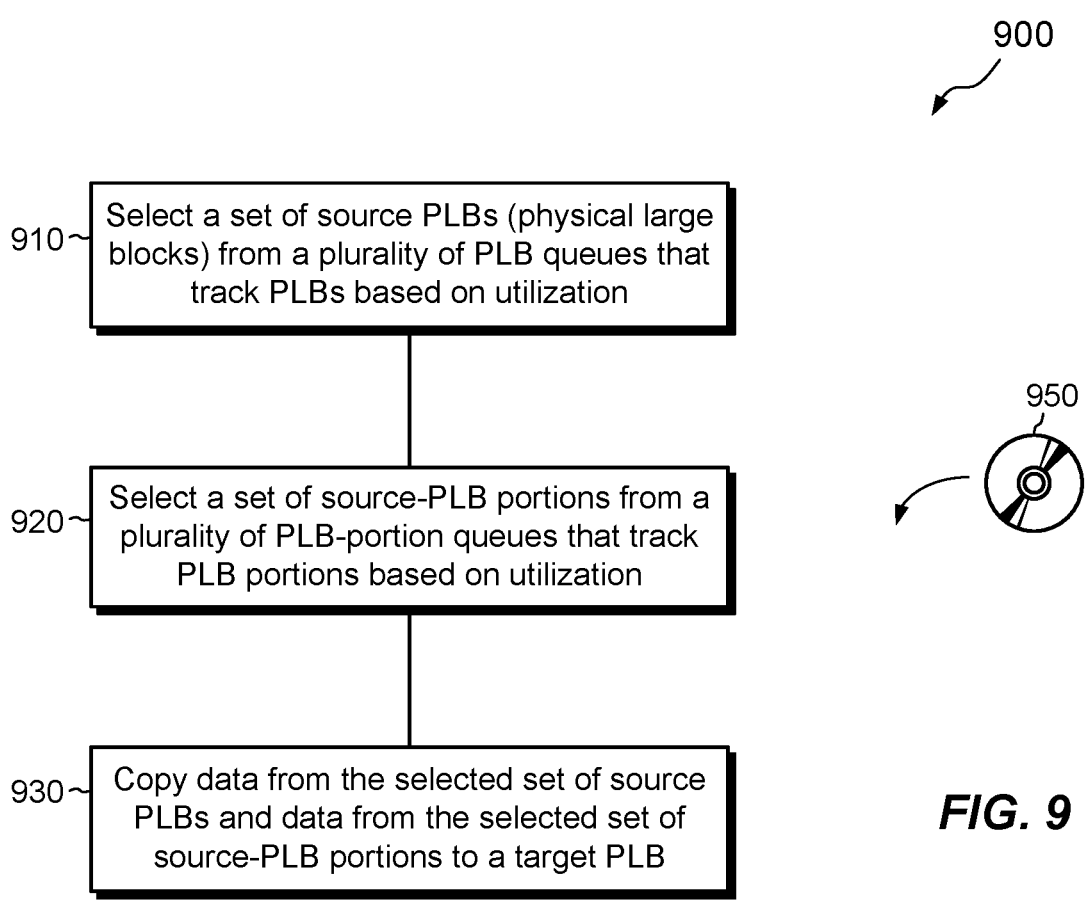
FIG. 9 is a flowchart showing an example method of consolidating storage space.

FIG. 9 shows an example method 900 of managing data consolidation and provides a summary of some of the features described above. The method 900 is typically performed, for example, by the software constructs described in connection with FIG. 1, which reside in the memory 130 of a node 120 and are run by the set of processors 124. The various acts of method 900 may be ordered in any suitable way. Accordingly, embodiments may be constructed in which acts are performed in orders different from that illustrated, which may include performing some acts simultaneously.

At 910, a set of source PLBs (physical large blocks) 710 is selected from a plurality of PLB queues 142 that track PLBs 270 based on utilization. At 920, a set of source-PLB portions (e.g., VLBs) 740 is selected from a plurality of PLB-portion queues 144 that track PLB portions 280 based on utilization. At 930, data are copied from the selected set of source PLBs 710 and data from the selected set of source-PLB portions 740 to a target PLB 750.

An improved technique has been described that consolidates data at multiple levels of granularity, the levels including a first level based on whole PLBs (physical large blocks) 270 and a second level based on portions 280 of donor PLBs. The technique further includes tracking PLBs 270 in multiple PLB queues 142 arranged based on storage utilization of the PLBs and tracking PLB portions (VLBs) in multiple portion queues 144 arranged based on storage utilization of the portions. When consolidating data to create a new PLB 750, a set 710 of whole PLBs is selected, based on utilization, from the PLB queues 142, and a set of portions 740 of donor PLBs is selected, based on utilization, from the portion queues 144. The selections are performed such that the total data size of the selected whole PLB(s) and the selected portion(s) fit within the new PLB 750.

Having described certain embodiments, numerous alternative embodiments or variations can be made. For example, although PLB portions described above correspond to VLBs, this is merely an example. Alternatively, portions may be formed based on other criteria, such as membership in certain volumes or other data objects.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of consolidating data storage space, comprising:
   selecting a set of source PLBs (physical large blocks) from a plurality of PLB queues that track PLBs based on utilization;
   selecting a set of source-PLB portions from a plurality of PLB-portion queues that track PLB portions based on utilization, none of the selected set of PLB portions belonging to any PLB of the selected set of source PLBs; and
   copying data from the selected set of source PLBs and data from the selected set of source-PLB portions to a target PLB,
   wherein the method further comprises providing queue elements for representing respective PLBs, wherein a queue element represents a particular PLB and identifies its own location within the plurality of PLB queues.

2. The method of claim 1, further comprising freeing the set of source PLBs.

3. The method of claim 2, wherein each of the set of source-PLB portions belongs to a respective donor PLB, and wherein the method further comprises freeing the set of source-PLB portions in each respective donor PLB, such that each respective donor PLB become less utilized.

4. The method of claim 1, wherein each PLB includes one or more PLB portions.

5. The method of claim 4, wherein each PLB portion contains data referenced by one and only one respective VLB (virtual large block), and wherein each VLB provides block virtualization for the data in the respective PLB portion.

6. The method of claim 5, wherein the plurality of PLB queues is provided for multiple ranges of PLB utilization, and wherein each of the plurality of PLB queues is provided for a single, respective range of PLB utilization.

7. The method of claim 6, wherein the plurality of PLB-portion queues is provided for multiple ranges of VLB utilization, and wherein each of the plurality of PLB-portion queues is provided for a single, respective range of VLB utilization.

8. The method of claim 7, wherein the ranges of VLB utilization are smaller than the ranges of PLB utilization.

9. The method of claim 7, wherein each of the ranges of PLB utilization has a respective upper range limit, and wherein selecting the set of source PLBs includes choosing from a particular set of PLB queues such that a sum of the upper range limits of the particular set of PLB queues corresponds to a completely utilized PLB.

10. The method of claim 9, wherein each of the ranges of VLB utilization has a respective upper range limit, and wherein the method further comprises:
determining a measure of utilization of the set of source PLBs that is more accurate than the sum of the upper range limits; and
determining a residual space based on a difference between a size of the target PLB and the more accurate measure of utilization,
wherein selecting the set of source-PLB portions includes choosing a PLB portion from a PLB-portion queue having an upper range limit that does not exceed the residual space.

11. The method of claim 1, wherein the queue element further identifies, for each VLB that references the particular PLB, its own location within the plurality of PLB-portion queues.

12. The method of claim 11, further comprising providing a tracking structure that identifies a list of queue elements that represent PLBs contained within a particular storage extent, and wherein the queue element further identifies its own location in the list of queue elements.

13. The method of claim 12, further comprising purging the particular storage extent from the tracking structure, wherein said purging includes, for each queue element in the list of queue elements, (i) removing the queue element from the plurality of PLB queues at the indicated location within the plurality of PLB queues and (ii) removing the queue element from the plurality of PLB-portion queues at the indicated location within the plurality of PLB-portion queues.

14. The method of claim 1, wherein the PLB queues of the plurality of PLB queues cover respective ranges of PLB utilization, each of the ranges having an upper range limit, and wherein selecting the set of source PLBs from the plurality of PLB queues includes choosing PLBs only from PLB queues whose upper range limits do not exceed a threshold level, the threshold level calculated as a system average level of PLB utilization plus a margin that does not exceed 20%.

15. The method of claim 14, further comprising populating the plurality of PLB queues with queue elements, including populating only those PLB queues that have upper range limits that do not exceed the threshold level.

16. A computerized apparatus, comprising control circuitry that includes a set of processors coupled to memory, the control circuitry constructed and arranged to:
select a set of source PLBs (physical large blocks) from a plurality of PLB queues that track PLBs based on utilization;
select a set of source-PLB portions from a plurality of PLB-portion queues that track PLB portions based on utilization, none of the selected set of PLB portions belonging to any PLB of the selected set of source PLBs; and
copy data from the selected set of source PLBs and data from the selected set of source-PLB portions to a target PLB,
wherein the control circuitry is further constructed and arranged to provide queue elements for representing respective PLBs, wherein a queue element represents a particular PLB and identifies its own location within the plurality of PLB queues.

17. A computer program product including a set of non-transitory, computer-readable media having instructions which, when executed by control circuitry of a computerized apparatus, cause the computerized apparatus to perform a method of consolidating data storage space, the method comprising:
selecting a set of source PLBs (physical large blocks) from a plurality of PLB queues that track PLBs based on utilization;
selecting a set of source-PLB portions from a plurality of PLB-portion queues that track PLB portions based on utilization, none of the selected set of PLB portions belonging to any PLB of the selected set of source PLBs; and
copying data from the selected set of source PLBs and data from the selected set of source-PLB portions to a target PLB,
wherein the method further comprises providing queue elements for representing respective PLBs, wherein a queue element represents a particular PLB and identifies its own location within the plurality of PLB queues.

18. The computer program product of claim 17, wherein each PLB includes one or more PLB portions, wherein each PLB portion contains data referenced by one and only one respective VLB (virtual large block), and wherein each VLB provides block virtualization for the data in the respective PLB portion.

19. The computer program product of claim 18, wherein the plurality of PLB queues is provided for multiple ranges of PLB utilization, wherein each of the plurality of PLB queues is provided for a single, respective range of PLB utilization, wherein the plurality of PLB-portion queues is provided for multiple ranges of VLB utilization, and wherein each of the plurality of PLB-portion queues is provided for a single, respective range of VLB utilization.

\* \* \* \* \*